United States Patent
Loeffelmann et al.

(10) Patent No.: US 11,441,656 B2
(45) Date of Patent: Sep. 13, 2022

(54) DIFFERENTIAL COMPRISING PINION GEARS, A DRIVE WHEEL, AND AT LEAST ONE COVER

(71) Applicant: Schaeffler Technologies AG & Co. KG, Herzogenaurach (DE)

(72) Inventors: Jochen Loeffelmann, Eggolsheim (DE); Florian Reinle, Kämpfelbach (DE); Peter Welker, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/282,808

(22) PCT Filed: Sep. 17, 2019

(86) PCT No.: PCT/DE2019/100818
§ 371 (c)(1),
(2) Date: Apr. 5, 2021

(87) PCT Pub. No.: WO2020/069692
PCT Pub. Date: Apr. 9, 2020

(65) Prior Publication Data
US 2021/0388888 A1    Dec. 16, 2021

(30) Foreign Application Priority Data
Oct. 4, 2018   (DE) ............... 10 2018 124 491.6

(51) Int. Cl.
*F16H 48/38*   (2012.01)
*F16H 48/40*   (2012.01)
*F16H 48/08*   (2006.01)

(52) U.S. Cl.
CPC ............. *F16H 48/08* (2013.01); *F16H 48/38* (2013.01); *F16H 48/40* (2013.01); *F16H 2048/085* (2013.01); *F16H 2048/385* (2013.01); *F16H 2048/387* (2013.01)

(58) Field of Classification Search
CPC .... F16H 48/08; F16H 48/38; F16H 2048/085; F16H 2048/387; F16H 2048/385; F16H 48/40
See application file for complete search history.

(56) References Cited

U.S. PATENT DOCUMENTS 6,061,907 A * 5/2000 Victoria ................. F16H 48/08
29/463
6,616,565 B1   9/2003 Chen et al.
(Continued)

FOREIGN PATENT DOCUMENTS

DE        4042173 A1 * 7/1992  ............. F16H 48/08
DE   102007040479 A1   3/2009
(Continued)

*Primary Examiner* — Sherry L Estremsky

(57) ABSTRACT

A differential (1) includes pinion gears (2, 3), a drive wheel (4), and at least one cover (5, 13), wherein: the outside of the drive wheel (4) has toothing (7) extending circumferentially around an axis of rotation (6) and the inside of the drive wheel is provided with bearing points (8, 9); the pinion gears (2, 3) are mounted on the bearing points (8, 9) in the drive wheel (4); and the differential (1) is closed on at least one side by the at least one cover (5, 13).

12 Claims, 2 Drawing Sheets

(56) References Cited

U.S. PATENT DOCUMENTS

| | | | | |
|---|---|---|---|---|
| 6,652,408 | B2 * | 11/2003 | Rutt | F16H 48/08 |
| | | | | 475/230 |
| 7,588,512 | B2 * | 9/2009 | Glassner | B60K 17/16 |
| | | | | 475/230 |
| 7,695,392 | B2 * | 4/2010 | Isken, II | F16H 48/08 |
| | | | | 475/230 |
| 8,167,761 | B2 * | 5/2012 | Di Micco | F16H 57/12 |
| | | | | 475/230 |

FOREIGN PATENT DOCUMENTS

| | | | | |
|---|---|---|---|---|
| DE | 102015220518 | A1 | 4/2016 | |
| GB | 329170 | A * | 5/1930 | F16H 55/12 |
| GB | 2540871 | A * | 2/2017 | F16H 48/08 |

* cited by examiner

DIFFERENTIAL COMPRISING PINION GEARS, A DRIVE WHEEL, AND AT LEAST ONE COVER

CROSS-REFERENCE TO RELATED APPLICATIONS

This application is the U.S. National Phase of PCT Appln. No. PCT/DE2019/100818 filed Sep. 17, 2019, which claims priority to DE 10 2018 124 491.6 filed Oct. 4, 2018, the entire disclosures of which are incorporated by reference herein.

TECHNICAL FIELD

The disclosure relates to a differential having pinion gears, a drive wheel and at least one cover, wherein the outside of the drive wheel has a toothing extending circumferentially around an axis of rotation and the inside of the drive wheel is provided with bearing points, the pinion gears are mounted on the bearing points in the drive wheel, and the differential is closed on one side by the cover.

BACKGROUND

Such a differential is described in DE 10 2007 040 479 A1. The differential has two covers with which the differential is closed on the left and right. The covers are fastened to the drive wheel by means of riveted connections. The drive wheel is provided with a flange for this purpose, which is provided with through holes for a riveted connection. The covers have a hole pattern that corresponds to that of the flange and are axially opposite one another on the flange. The respective rivet engages through the hole in the flange and lies with the rivet heads pressed against the cover.

A further differential of this kind is described in U.S. Pat. No. 6,616,565 A. The pinion gears are positioned on a common bolt which is connected to the flange of the drive wheel via a dowel pin connection. The covers of the differential are also fastened to the flange by means of screw connections, which flange is provided with through holes for the screw connections.

SUMMARY

It is desirable to create a differential that can be easily and inexpensively manufactured and assembled.

The pinion gears are held in the bearing points in the flange and, with the aid of the cover, in the drive wheel. The cover is fastened to the drive wheel by at least one material connection without the action or effect of further fastening means. The differential formed at least from the pinion gears, the drive wheel and the cover is thus a self-retaining unit. The advantage lies in that no fastening means such as rivets or screws are used and thus the costs of these components are saved. In addition, the assembly costs are reduced as there is no need to thread and screw or press the rivet heads. In addition, the accuracy of the structural unit is increased, which has a positive effect in particular on the precision of the tooth contact of the compensation with the output wheels. The drive wheel is the cumulative shaft of the differential, via which the power from a vehicle drive is brought into the differential and from there distributed to the vehicle wheels or on which the retroactive power over the vehicle wheels is totaled. Differential speeds on the vehicle wheels are compensated for via the pinion gears in cooperation with the output wheel, for which purpose these mesh with the output wheels and are rotatably mounted on the drive wheel about their own axis of rotation.

The drive wheel may have a flange. The drive wheel has external toothing, which is designed either as spur toothing or, alternatively, as bevel gear toothing. The flange adjoins this external toothing radially inwards and extends in the form of segments or disks radially inwards in the direction of the axis of rotation. The flange has proportional bearing points. The bearing points are formed entirely by recesses in the flange and sections of the cover(s). One of the pinion gears is mounted in each bearing point. The advantage is that no separate components such as bars or cages are required for mounting the pinion gears.

The differential may be closed by two covers. One cover adjoins the flange on the left and the other on the right. It is particularly advantageous if the covers are designed as identical parts, i.e., identical in terms of design. Such covers can preferably be produced as drawn parts made from sheet metal. Due to the identical design, the covers can be produced in larger batches and thus inexpensively. In general, the design of the differential allows the use of different materials, in particular metals, different alloys and processing states. It is conceivable, for example, that the drive wheel is a forged part made of steel or a cast part. If only one cover is used, it is also conceivable that a "cover" or one half of a differential cage is also integrated into the drive wheel. The other side may be closed with the cover, which is preferably attached to the drive wheel by means of welding. It is advantageous that the material connection is preferably a welded connection between metallic materials, preferably iron materials and their alloys.

The pinion gears may each be rotatably mounted with a pin in the drive wheel. The pin can be formed in one piece with the respective pinion gear or may be inserted into said pinion gear. The pin is rotatably seated in the bearing point or is supported there via a plain bearing or roller bearing in the bearing point of the drive wheel. Such mounting is simple and robust. Alternatively, the pinion gears may sit on a common bolt, which is accordingly provided with the pin and which is mounted in opposite radial positions in each case in a bearing point of the drive wheel. Such an arrangement is simple and can be manufactured inexpensively.

The differential may have at least one or, preferably, two output wheels which are integrated into the self-retaining unit. Each of the output wheels is connected to an output shaft which, for example, leads to a driven vehicle wheel. This is advantageous because the output wheels that mesh with the pinion gears can be easily integrated into the structural unit. The connection of the output shafts with the output wheels is then preferably made via plug-in axle connections.

DETAILED DESCRIPTION

In the following, the differential is explained in more detail with reference to an exemplary embodiment.

Figure 1:
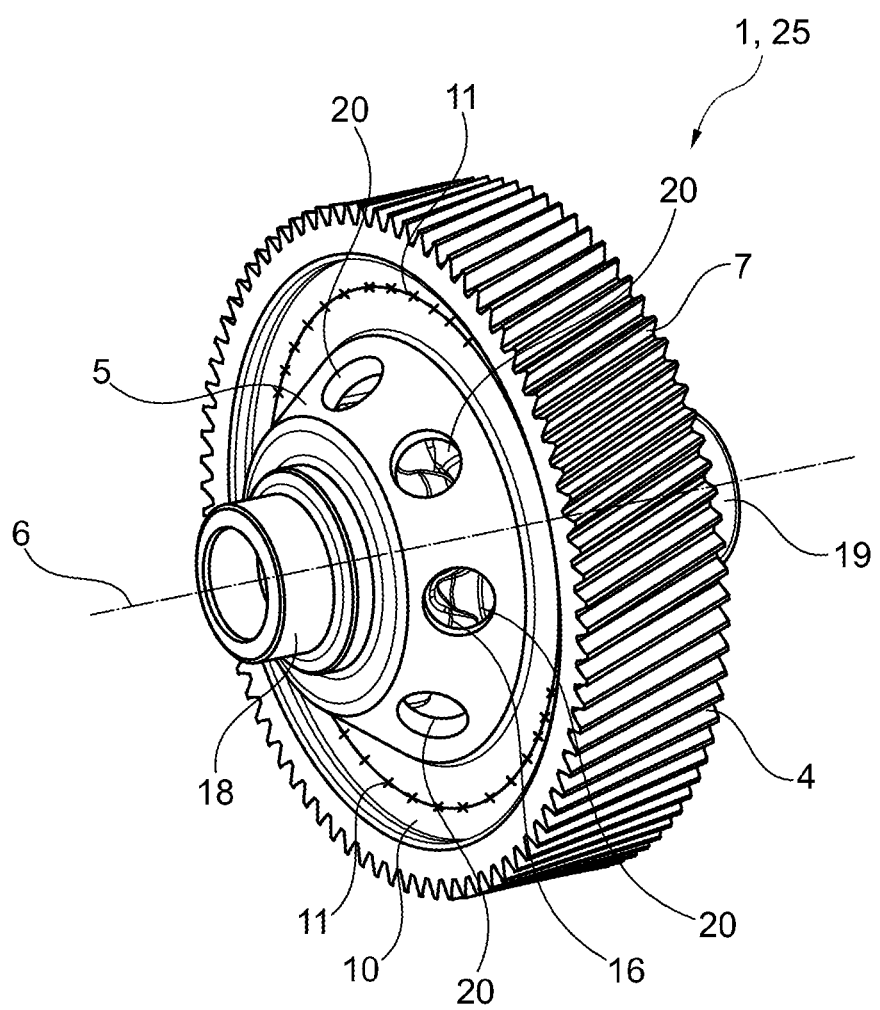
FIG. 1 shows a differential in an overall view.

FIG. 1 shows a differential 1 in an overall view. From the differential 1, a drive wheel 4 with a toothing 7 designed as a helical spur toothing, a cover 5 and the shafts 18 and 19 of two output wheels 16 can be seen. In addition, fragments of an output wheel 16 can be seen through the holes 20. The drive wheel 4, the cover 5 and the output wheels 16 are arranged coaxially with respect to an axis of rotation 6 of the differential 1. A plurality of material connections 11, symbolized by crosses, are formed between the cover 5 and a flange 10 of the drive wheel 4. Alternatively, the crosses symbolize the course of a welded connection between the cover 5 and the drive wheel 4 that runs partially around the circumference, alternatively in sections or closed on the circumference.

Figure 2:
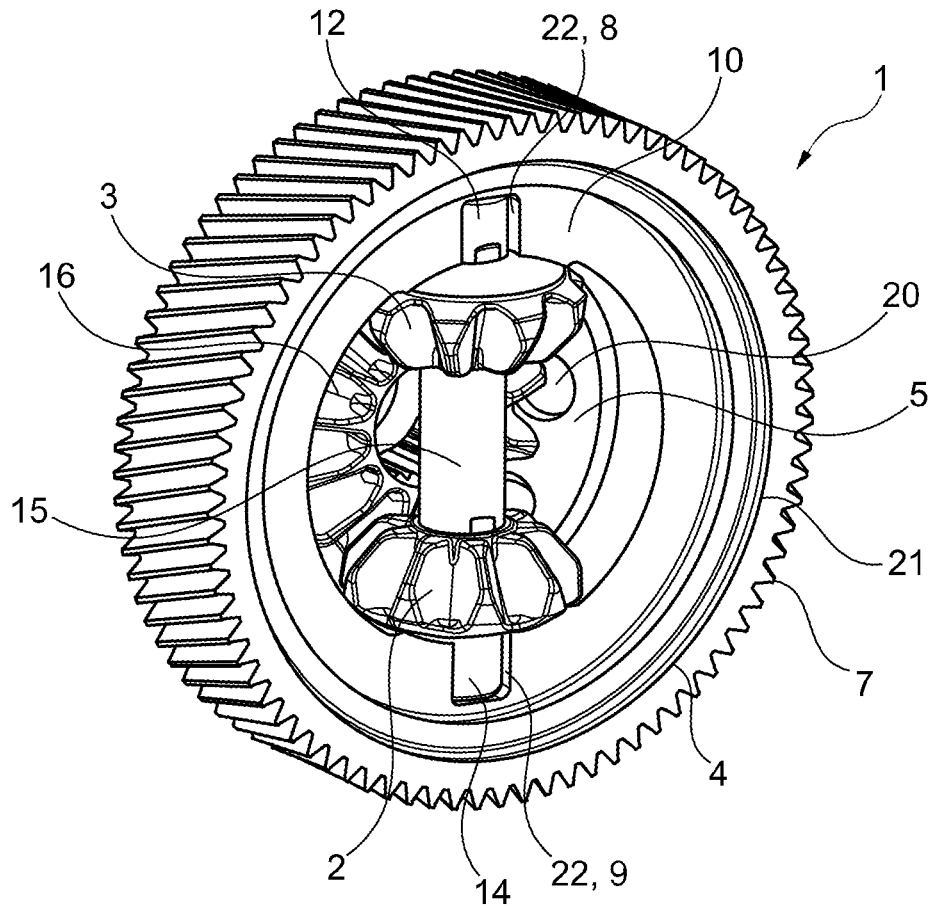
FIG. 2 shows a view of the differential of FIG. 1 without a cover.

FIG. 2 shows a view of the differential 1 without a cover 13 of the two covers 5 and 13. It should be noted in this regard that the covers 5 and 13 are connected to the drive wheel 4 by a material connection, i.e., non-detachably. The covers 5 and 13 can therefore only be removed with force by severing. Accordingly, FIG. 2 is only intended to illustrate the internal design of the differential 1. The disk-shaped flange 10 is surrounded on the outside circumferentially by a base body 21 of the drive wheel 4 having the toothing 7 and extends radially inward from the base body 21. Recesses 22 that are open radially inward and in the two axial longitudinal directions are formed on the flange 10. The recesses 22 form bearing points 8 and 9. Two pinion gears 2 and 3 are accommodated in the drive wheel 4. For this purpose, the pinion gears 2 and 3 are seated on a bolt 15 in such a way that pins 12 and 14 of the bolt 15 protrude radially. Each of the pins 14 and 15 is seated in a recess 22 in such a way that the pin 15 is supported in the circumferential direction about the axis of rotation in the bearing points 8 and 9. An output wheel 16 meshes with both pinion gears 1 and 2.

Figure 3:
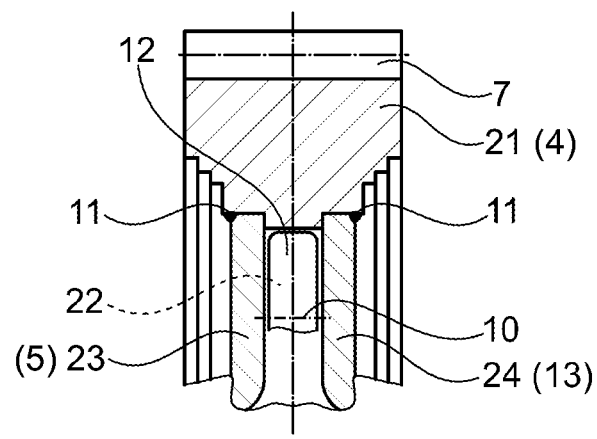
FIG. 3 shows a detailed representation of a longitudinal section through the differential of FIG. 1.

FIG. 3 shows a detailed representation of a longitudinal section through the differential 1 in a longitudinal plane in which the axis of rotation 6 of the differential 1 also extends axially longitudinally. The base body 21 of the drive wheel 4 and a section of the pin 12 as well as flange sections 23 and 24 of the covers 5 and 13 can be seen. The toothing 7 protrudes radially outward from the drive wheel 4 and the flange 10 protrudes radially inward. The pin 12 is seated in a recess 22 which forms the bearing point for the pinion gear 3 of the pinion gears 2 and 3. The recess 22 is closed in the axial directions by one of the flange sections 23 or 24 of the respective cover 5 or 13, so that the pin 12 is held and guided axially in the flange 10. For this purpose, the covers 5 and 13 lie flat against the flange 10 with the flange sections 23 and 24 and are welded to the drive wheel 4 via the material connections 11. The recesses 22 and the parts of the flange sections 23 and 24 which cover the respective recesses 22 each form one of the bearing points 8 and 9, respectively.

The fully assembled differential 1 is a unit 25 made from the drive wheel 4, the pinion gears 2 and 3, the covers 5 and 13, the bolt 15 and two output wheels 16, which is held together in a self-retaining manner only by the material connection(s) without the aid of other fastening means.

LIST OF REFERENCE SYMBOLS

1 Differential
2 Pinion gear
3 Pinion gear
4 Drive wheel
5 Cover
6 Axis of rotation of the differential
7 Toothing
8 Bearing point
9 Bearing point
10 Flange
11 Material connection
12 Pin
13 Cover
14 Pin
15 Bolt
16 Output wheel
17 Axis of rotation of the pinion gear
18 Shaft
19 Shaft
20 Hole
21 Base body
22 Recess
23 Flange portion of the cover 5
24 Flange portion of a cover 13
25 Unit

The invention claimed is:

1. A differential comprising pinion gears, a drive wheel and at least one cover, wherein
   an outside of the drive wheel has a toothing extending circumferentially around an axis of rotation and an inside of the drive wheel including a flange having recesses that form bearing points,
   the pinion gears are mounted on the bearing points in the drive wheel,
   the differential is closed on one side by the cover, wherein the cover includes a flange section arranged to completely close the recesses such that the flange section forms one of the bearing points, and
   the pinion gears are mounted on the bearing points in the drive wheel,
   the differential is clsoed on one side by the cover, wherein the cover includes a flange section arranged to completely close the recesses such that the flange section forms one of the bearing points, and
   the pinion gears are held in the drive wheel by the cover, and the cover is fastened to an inner diameter of the flange only by at least one material connection without further fastening means.

2. The differential according to claim 1, wherein the cover abuts the flange.

3. The differential according to claim 1, wherein the differential is closed by two of the covers.

4. The differential according to claim 3, wherein the covers are identical parts.

5. The differential according to claim 1, wherein the material connection is at least one welded connection between two metallic materials.

6. The differential according to claim 1, wherein the pinion gears are each rotatably mounted in the drive wheel with a pin.

7. The differential according to claim 6, wherein the pins are formed on a bolt common to the pinion gears, wherein the bolt is supported in the bearing points by means of the pins.

8. The differential according to claim 1, wherein the differential has output wheels which mesh with the pinion gears.

9. The differential according to claim 1, wherein the differential has output wheels which mesh with the pinion gears and are mounted in the cover.

10. A differential comprising:
    a drive wheel having external toothing and a flange extending inward, the flange having at least two bearing pockets formed therein;

at least two pinion gears supported in pins, wherein each pin extends radially into a corresponding bearing pocket;

two drive gears, each drive gear meshing with each of the pinion gears; and at least one cover materially joined to an inner diameter of the flange, the cover including a flange section arranged to completely close the bearing pockets.

11. The differential of claim 10 wherein the at least one cover comprised two covers materially joined to axially opposite surfaces of the flange.

12. The differential of claim 11 wherein the two covers are interchangeable.

* * * * *